Figure 1:
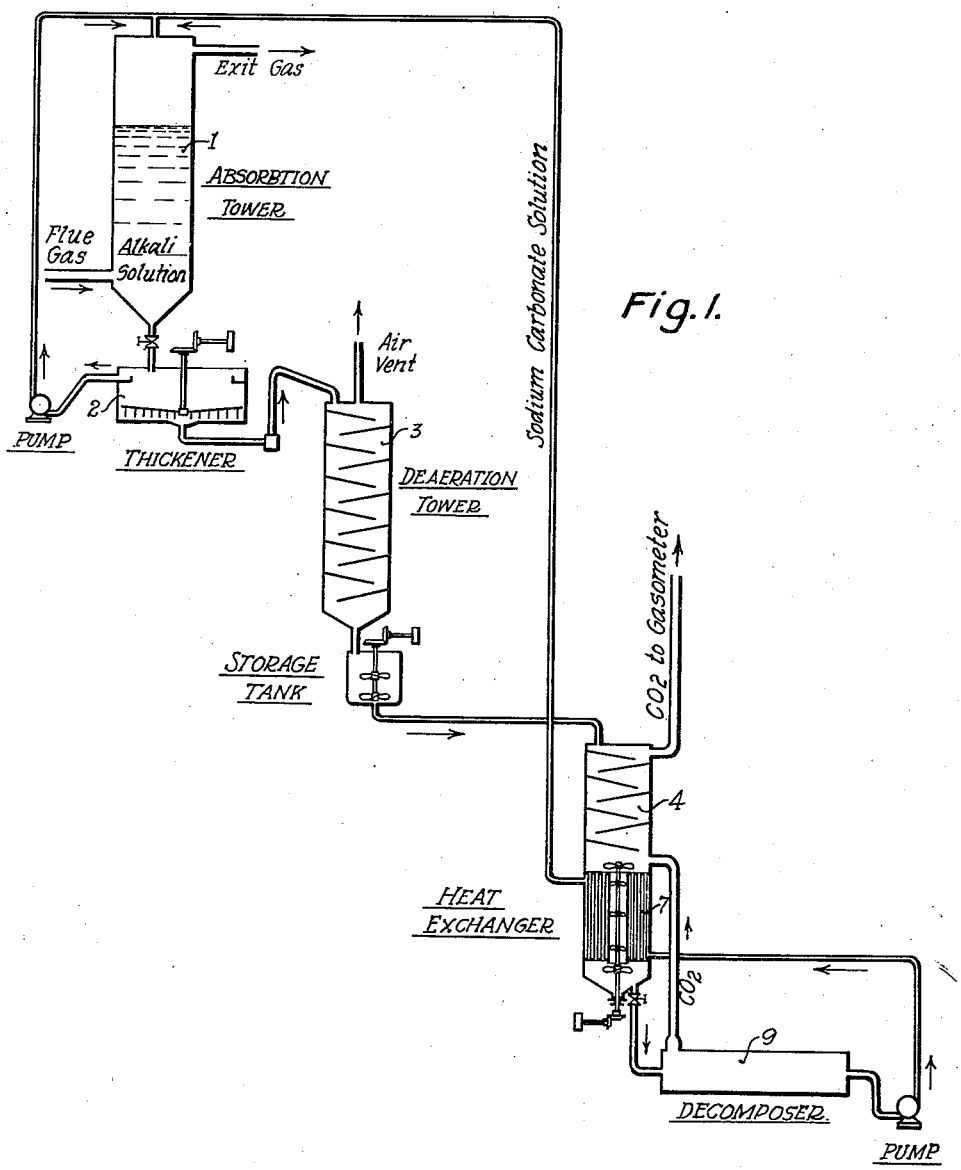

Patented June 25, 1940

2,205,962

UNITED STATES PATENT OFFICE 2,205,962

RECOVERY OF CARBON DIOXIDE

Gustave T. Reich, Philadelphia, Pa.

Application July 15, 1938, Serial No. 219,444

6 Claims. (Cl. 23—150)

This invention relates to the recovery of carbon dioxide and is particularly directed to an improved method of recovering carbon dioxide from gases containing this substance by absorbing the carbon dioxide in alkali carbonate solutions and decomposing the alkali bicarbonate thus formed by heat.

A principal object of the invention is the provision of a method whereby the recovery of carbon dioxide may be effected more efficiently, with lower heat expenditure and smaller space requirements than heretofore.

In the processes for the recovery of carbon dioxide, as practiced heretofore, the gases containing the carbon dioxide have been contacted with alkali carbonates of such concentration and for such time that at the completion of the absorption operation the alkali bicarbonate is wholly in solution. It has now been found that the efficiency of the recovery process may be very greatly increased by carrying out the absorption operation under such conditions that a substantial amount of alkali bicarbonate is produced in the solid form, thus forming a suspension of solid alkali bicarbonate in a saturated solution of alkali bicarbonate containing greater or lesser amounts of alkali carbonate in solution, and by decomposing at least a portion of the alkali bicarbonate suspension thus formed by heating the suspension, whereby the alkali bicarbonate is decomposed into carbon dioxide which is removed in gaseous form and alkali carbonate which remains in solution and is returned to the absorption operation. Further increase in efficiency may be obtained by thickening the suspension of alkali bicarbonate, as by allowing it to settle in the absorption chamber or elsewhere or in other suitable manner, before subjecting it to the decomposing operation.

The absorption may be carried out either under atmospheric or super-atmospheric conditions. It is particularly desirable that the concentration of alkali carbonate and bicarbonate be maintained below the point at which the double salt of alkali carbonate and alkali bicarbonate is formed in order to avoid difficulties in handling and decomposing the suspensions of alkali bicarbonate. For the sodium carbonate-bicarbonate system concentration of the solutions should preferably be less than 100 grams of soduim (Na) per liter, at a temperature of 25° C.

The thickening of the slurry may be effected in a Dorr thickener or other suitable device that permits the thinner part of the liquid to be drawn off, thickening the rest of the slurry and producing a greater proportion of bicarbonate in the portion of the slurry that is thickened. The thickened portion of the slurry is then heated and conveyed to the thermal decomposer. The heating of the thickened slurry previous to decomposition may be accomplished very conveniently by passing it in contact with the hot carbon dioxide from the decomposer. This carbon dioxide gas carries with it much moisture which is removed and absorbed into the slurry in passing through it and therefore passes back into the decomposer. A further heating of the slurry, before reaching the decomposer, may be effected by passing it in counter-current through a heat exchanger with the carbon dioxide leaving the decomposer. In the decomposer, dissociation of the bicarbonate in solution and suspended bicarbonate takes place. The continuous feeding of the slurry into the decomposer continually brings into it fresh portions of suspended bicarbonate, which in turn is absorbed into solution and decomposed. The liquid from which the carbon dioxide has been liberated and which is largely a solution of alkali carbonate, though it may contain greater or less amounts of alkali bicarbonate, is then conveyed back to the absorption tower. The carbon dioxide gas is taken to a gasometer or directly into use. The thinner liquid from the thickener may be returned directly to the carbonating tower. It will contain chiefly alkali carbonate and alkali bicarbonate in solution, and perhaps a small amount of alkali bicarbonate in suspension.

Figure 2:
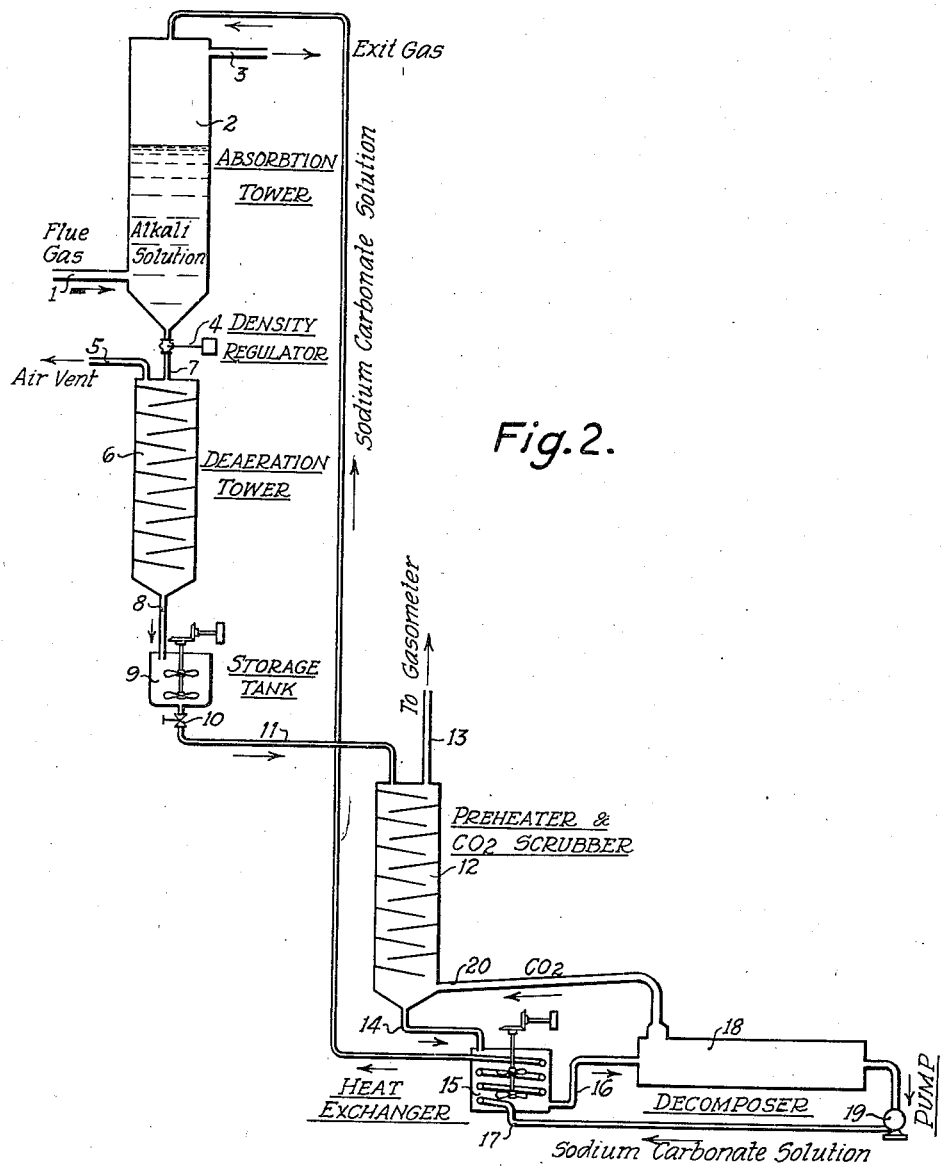

The invention will be more particularly described, for the purpose of illustrating the principle involved, with reference to the accompanying drawings in which:

Fig. 1 is a diagrammatic view of one embodiment of the invention, including a thickener; and Fig. 2 is a diagrammatic view of another embodiment of the invention in which the thickener is not used.

A sodium carbonate solution at a temperature of 30 to 50° C. and containing 12 to 18 pounds of sodium carbonate and 5 to 12 pounds of bicarbonate per cubic foot in solution is pumped into the carbonation tower 1. This tower, in construction and operation, may be similar to the usual soda ash carbonation tower or it may be in the form described in my application Serial No. 116,041, filed December 15, 1936, and may be preferably operated under pressure, depending upon the concentration of the flue gas. The more dilute the flue gas the higher the pressure used, so that an economical carbon dioxide recovery is possible. After carbonation the mixture not only contains sodium bicarbonate in saturated solution, but also sodium bicarbonate in suspension. This suspension may be agitated to prevent the deposit of the solid bicarbonate. By means of a density thickener, a liquid may be continuously withdrawn which may contain in solution and in suspension a total of 15 to 30 pounds of sodium bicarbonate per cubic foot. Such density may also be obtained by withdrawing the carbonated liquid continuously into a Dorr thickener, or similar mechanical device, and the excess sodium bicarbonate contained in the carbonate solutions returned to the carbonation tower.

The mixture containing sodium bicarbonate in solution and suspension may then pass into the deaerating tower 3. This tower need only be used should the concentrated sodium bicarbonate solution contain some air, which must be removed so that the carbon dioxide recovered afterward shall have a purity of at least 99.5% carbon dioxide. The deaerating tower may be either a tower provided with baffle plates, as shown in the drawings, or any suitable equipment which will not cause separation of the suspended sodium bicarbonate from the dissolved sodium bicarbonate.

The deaerated mixture may then pass into the preheater through which the hot carbon dioxide gas, saturated with water vapor, passes. The preheater 4 serves first for the preheating of the sodium bicarbonate solution by direct contact with the hot carbon dioxide gas coming from the decomposer. After passing through it, the carbon dioxide gas is cooled before it is collected, preferably in the gasometer. Another function of this preheater is to reduce the water carried away with the hot carbon dioxide gas. As the concentration of the alkali solution passing to the carbonation tower should be constant to obtain the best results, the water carried away with the hot carbon dioxide must be replaced. However, by returning same with the alkali solution passing through the preheater a constant concentration can readily be maintained, and the sensible heat in the vapors helps to preheat the incoming alkali bicarbonate slurry. The preheater may be of the same construction as the deaerator or be any suitable equipment which will not disturb the equilibrium between the suspended and dissolved sodium bicarbonate.

From the preheater the alkali solution passes through a heat exchanger 7. Here the incoming sodium bicarbonate suspension is preheated by means of the sodium carbonate solution coming from the decomposer. The sodium carbonate solution coming from the decomposer is preferably not cooled below 70° C. (or not below the temperature at which solids precipitate out) before going to the carbonation tower or before being mixed with liquor free from suspended solids. The heat exchanger on the incoming sodium bicarbonate liquid side is vented to the preheater, so that any carbon dioxide given off in the heat exchanger may pass to the gasometer also.

The heat exchanger is preferably provided with an agitator so that the solids will be kept in suspension and not settled out. A rotary tubular heat exchanger may also be used or any mechanical means preventing the separation of solids from the liquid whereby a good conductivity of heat is effected between the incoming sodium carbonate and the outflowing hot sodium carbonate solution.

The preheated sodium bicarbonate solution passes now from the heat exchanger into the decomposer 9. This is preferably a continuous apparatus such as a tubular boiler that revolves so that no incrustation or sedimentation of the suspended sodium bicarbonate will occur. It may be a shell evaporator provided with baffle plates or agitators or both, so that a slow, gradual decomposition, and no mixing of progressively decomposed solution takes place. The heating may either be by steam or open fire, depending upon the local conditions. The carbon dioxide which is given off by the decomposition of the sodium bicarbonate passes first through the preheater for the purpose stated above. After being freed of its excess water and cooled to the proper temperature, it is passed into the gasometer from whence it is pumped to the compressor, purified and liquefied. The hot, largely decomposed bicarbonate solution, after passing through the heat exchanger and being cooled somewhat, is returned to the carbonation tower and is recarbonated. This cycle of operation is repeated thus giving the process a continuity of operation.

The processes above described may be continuous, no foreign chemicals are employed, therefore no contamination can take place.

The decomposing temperature is preferably above 100° C., for example, 105 to 125° C. so that a quick decomposition may take place. It is sometimes advisable to use pressure, which is a common procedure in the carbon dioxide recovery plants. If pressure is used, provision must be made to feed the suspended material in at an even rate.

The general flow of the alkali solution in the mode of operation described above by way of example is as follows:

The solution flows through the carbonation tower wherein alkali carbonate is converted to alkali bicarbonate with the formation of a suspension or slurry containing suspended bicarbonate. The suspension from the carbonation tower may be separated into a thickened portion and a liquid portion containing substantially no suspended bicarbonate which remains in or is returned to the tower. The suspension or the thickened portion of the suspension is passed through the decomposer wherein alkali bicarbonate is dissociated to alkali carbonate and carbon dioxide. The solution of alkali carbonate, mixed, if desired, with the liquid portion separated from the suspension, is returned to the carbonation tower, diluting if necessary.

It will be seen that the invention is subject to a large number of variations without departing from the characteristic principle that the carbonation of the alkali carbonate solution is continued until a suspension of alkali bicarbonate is formed therein and that the suspension or slurry of alkali bicarbonate, either as formed or after thickening, is subjected to heating to thermally decompose at least a portion of the alkali bicarbonate into carbon dioxide and alkali carbonate, the formation of the unmanageable double salt of alkali carbonate and bicarbonate being avoided by keeping the total concentration below that at which the double salt will form under the conditions of operation. The process can, of course, be operated with potassium carbonate and bicarbonate or with a mixture of sodium and potassium carbonates and bicarbonates.

This application is a continuation-in-part of my application Serial No. 697,966, filed November 14, 1933.

I claim:

1. A process of isolating carbon dioxide from flue gases which comprises absorbing the carbon dioxide in an alkali carbonate solution until there is produced a slurry containing alkali bicarbonate in suspension, thickening the slurry and thermally decomposing the thickened slurry at a temperature above 50° C. whereby carbon dioxide is evolved and the formation of the double salt of alkali carbonate and bicarbonate is substantially prevented.

2. A process as defined in claim 1 wherein the hot misture-containing carbon dioxide gas evolved in the decomposition is passed through the thickened slurry prior to its decomposition whereby the slurry is heated and diluted.

3. A process as defined in claim 1 wherein the alkali bicarbonate slurry is deaerated before it is thermally decomposed.

4. A process of isolating carbon dioxide from flue gases which comprises absorbing the carbon dioxide in an alkali carbonate solution until there is produced a slurry containing alkali bicarbonate in suspension, thickening the slurry to a concentration of about 15 to 30 pounds of alkali bicarbonate per cubic foot of liquid and thermally decomposing the thickened slurry at a temperature above 50° C. whereby carbon dioxide is evolved and the formation of the double salt of alkali carbonate and bicarbonate is substantially prevented.

5. A process of isolating carbon dioxide from flue gases which comprises absorbing the carbon dioxide in an alkali carbonate solution until there is produced a slurry containing alkali bicarbonate in suspension, thickening the slurry by removing therefrom a portion of the liquid phase substantially free from suspended alkali bicarbonate and thermally decomposing the thickened slurry at a temperature above 50° C. whereby carbon dioxide is evolved and the formation of the double salt of alkali carbonate and bicarbonate is substantially prevented.

6. A process for the recovery of carbon dioxide from flue gases which comprises absorbing the carbon dioxide in an alkali carbonate solution until at a temperature at least as high as 30° C. until a suspension of alkali bicarbonate containing a substantial proportion of solid alkali bicarbonate is formed therein while maintaining the concentration of alkali carbonate and bicarbonate below the point at which the formation of the double salt of alkali carbonate and bicarbonate occurs, and thermally decomposing the alkali bicarbonate with the evolution of carbon dioxide by heating the suspension formed in the absorbing operation at a temperature of from about 50° C. to about 125° C.

GUSTAVE T. REICH.

CERTIFICATE OF CORRECTION.

Patent No. 2,205,962.　　　　　　　　　　　　　　　　June 25, 1940.

GUSTAVE T. REICH.

It is hereby certified that error appears in the printed specification of the above numbered patent requiring correction as follows: Page 3, first column, line 13, claim 2, for "misture-containing" read --moisture-containing--; and second column, line 16, claim 6, strike out "until" before "at"; and that the said Letters Patent should be read with this correction therein that the same may conform to the record of the case in the Patent Office.

Signed and sealed this 30th day of July, A. D. 1940.

(Seal)

Henry Van Arsdale,
Acting Commissioner of Patents.